Nov. 21, 1967   R. L. PALMER   3,353,819
FISH HOOK DEVICE
Filed Nov. 9, 1964

INVENTOR.
ROY L. PALMER
BY
John P. Murphy
ATTORNEY ly, it is an object of my device to enable a fly lure to be securely held for attaching a fishing line thereto. A further object of my device is to firmly hold a fly lure such that the lure may easily be grasped and manipulated by a man's fingers.
United States Patent Office 3,353,819
Patented Nov. 21, 1967

3,353,819
FISH HOOK DEVICE
Roy L. Palmer, 356 Groton Road,
Cortland, N.Y. 13045
Filed Nov. 9, 1964, Ser. No. 409,814
4 Claims. (Cl. 269—254)

The following relates to a fishing utensil and more particularly to a device for gripping fly hooks. A common problem fishermen encounter when changing fly lures is holding the lures firmly in position. Such "flies" tend to be very small, light and very difficult to hold by a man's comparatively large fingers. To attach a "fly" to the line, a loop must be made through the "eye" shaped opening of the fly lure by the fishing line. The portion of the line which is affixed to the fly lure will hereinafter be described as the "leader." It is in making the loop through the fly that difficulty is encountered since it is very difficult to hold the fly while at the same time making a secure knot with the thin inflexible leader.

Accordingly, it is an object of my device to enable a fly lure to be securely held for attaching a fishing line thereto. A further object of my device is to firmly hold a fly lure such that the lure may easily be grasped and manipulated by a man's fingers.

Other objects will appear in the following description of the device as well as in the accompanying drawings wherein.

In general, this device comprises a vise and support in and upon which "flies" can be held and means for securing the "flies" rigidly to the vise.

Figure 1:
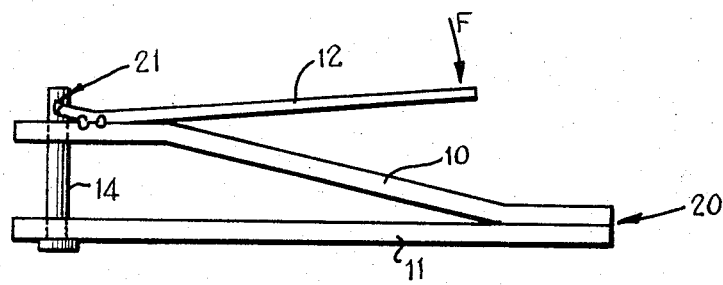
FIG. 1 depicts a side assembly view of the device at approximately twice normal size.
Figure 2:
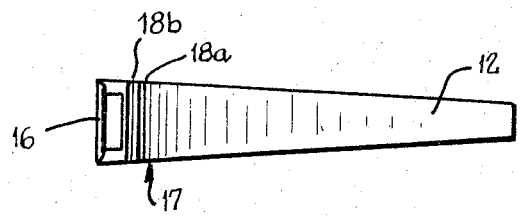
FIG. 2 depicts a bottom view of the lever handle of the device.
Figure 3:
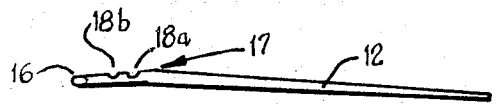
FIG. 3 depicts a side view of the lever arm.

Referring to FIG. 1, the device, in general, consists of two spring members 10 and 11 which are welded together at one end 20. A pin 14 with a hook 21 on one end communicates through holes in both spring members 10 and 11 with the projecting hook portion extending above the upper spring member as shown, and leaving a wide flange at the other end of said pin 14. The hook 21 grasps a corresponding lever bar 16, a part of the upper lever handle 12. The lever handle 12 is most easily seen in FIGS. 2 and 3. This handle 12, which operates the spring members 10 and 11 consists of a one-piece bar bent at point 17 which acts as a bearing point against the top spring 10. Under influence of a force acting at the end opposite bar 16, the lever handle bears against the upper spring member 10 to move it towards spring 11.

Figure 4:
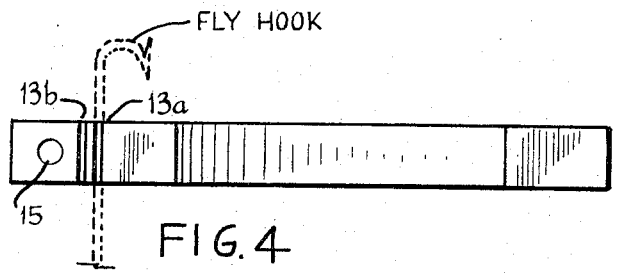
FIG. 4 depicts a top view of the top spring member.
Figure 5:
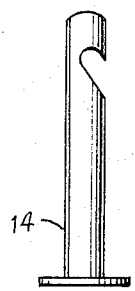
FIG. 5 is a side elevational view of a pin forming a part of the device.

To grip a hook of a fly lure, grooves 18a and 18b are provided on the bottom of lever handle and also on the upper face of the top spring member 13a and 13b. When the device is assembled, these grooves lie substantially together in a parallel direction such that a fish hook shank may be gripped in them as seen in FIG. 4. Under a force on the lever handle 12, the grooved portitons of both members 12 and 10 serve to fixedly hold the fly hook therewithin. Alternatively, the grooves 18a and 18b may be curved so that the curve of the hook of the fishhook may be gripped between curved grooves (not shown) 18a and 18b, in the manner similar to that as seen in FIG. 4.

The spring portions of the vise tend to add resilience to the holding action of the device and thereby grip the shank of the fly hook more securely. Also, more tension (force F) may be easily placed on the shank of the hook conveniently and quickly. To manipulate the fly easily and hold it in place when little gripping force is desired on the fly, the tension in the vise as assembled serves to hold the fly adequately. As seen in FIG. 1, there is always some tension in the spring members 10 and 11 which is sufficient to cause the lever handle 12 to bear against the top spring member due to the action of the hook 21 of the pin 14 on the bar 16 of the lever handle 12.

Additional modifications contemplated are the use of a multiple number of grooves, as may be desired. Various resilient materials, such as metal, particularly steel, and various plastics are contemplated.

The particular shape and configuration of my device as disclosed in the figures shall only serve to indicate the general structure and features of my device.

I claim:
1. A clamping device including a spring, said spring composed of two flat resilient members, a lower member and an upper member, dispersed one above the other, said resilient members being fastened at one end, each of said resilient members having a hole through the end not fastened; a pin, said pin having a hook portion at one end, and a wide flanged portion at the other end; an upper lever arm, said lever arm bent in a shallow V shape, said lever arm having an opening through one end, said pin disposed through the holes of the upper and lower members of the spring, said hole of lever arm communicating with the hook portion of the pin and engaged thereto, grooved portions disposed on the upper face of the upper member of the spring, grooved portions on the lever arm in close proximity to the opening in said lever arm and communicating with said grooved portions on the upper face of said upper member of the spring.

2. A clamping device as in claim 1, wherein all parts are made of steel.

3. A clamping device as in claim 1 wherein all parts are made of plastic.

4. A clamping device as in claim 1 wherein the number of grooved portions on the upper member of the spring and lever arm respectively are two.

References Cited
UNITED STATES PATENTS

| | | | |
|---|---|---|---|
| 157,293 | 12/1874 | Pitt | 81—43 |
| 3,093,147 | 6/1963 | Bassett | 30—28 X |
| 3,140,715 | 7/1964 | Whitton et al. | 81—43 |

WILLIAM W. DYER, Jr., *Primary Examiner.*

W. D. BRAY, *Assistant Examiner.*